June 7, 1938.  A. MOORE  2,119,885
ANTERIOR THROTTLE COLD CHARGE CARBURETOR
Filed Dec. 11, 1934
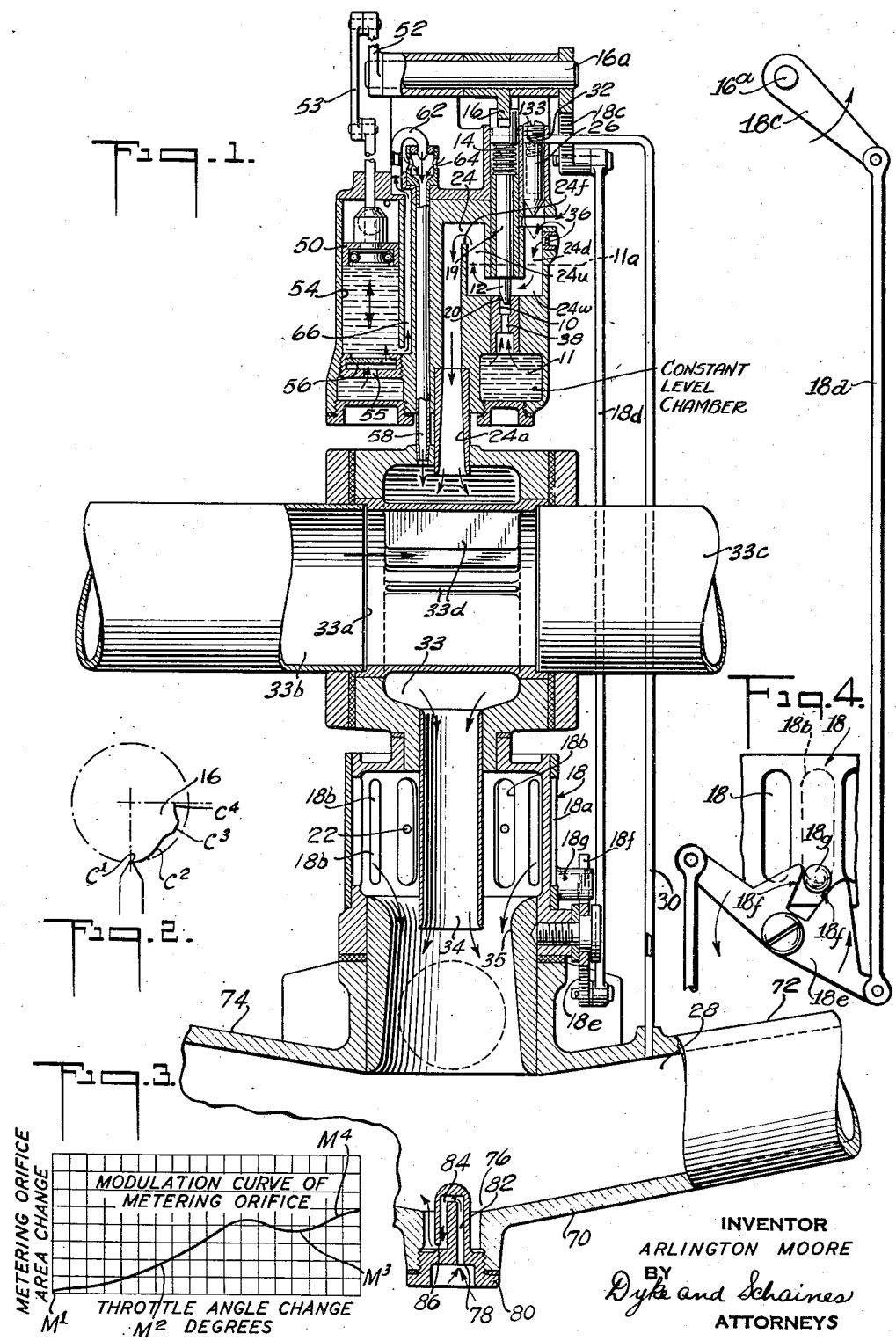
INVENTOR
ARLINGTON MOORE
BY
Dyke and Schaines
ATTORNEYS Patented June 7, 1938

2,119,885

UNITED STATES PATENT OFFICE 2,119,885

ANTERIOR THROTTLE COLD CHARGE CARBURETOR

Arlington Moore, Louisville, Ky., assignor, by mesne assignments, to Maxmoor Corporation, New York, N. Y., a corporation of Delaware Application December 11, 1934, Serial No. 756,967

5 Claims. (Cl. 123—122)

My invention relates to a carburetor for internal combustion engines, and especially to an anterior throttle carburetor having provision for thoroughly vaporizing the fuel by application of heat made thereto while in admixture with primary air only, and having provision for supplying the main air constituent in cold or unheated state, whereby the resulting charge mixture of the fuel with the entire air supply going to the engine cylinders is relatively cold and dense, and high volumetric efficiency is attained.

According to the present invention fuel metered to suit the operating conditions prevailing is admixed with primary air, and efficient application of heat is made to such mixture for producing excellent fuel vaporization, the heat being preferably applied by directing the fuel in finely divided state against surfaces so highly heated that spheroidal vaporization is effected. During the general ranges of engine operation, additional cold or atmospheric air is supplied to join with the primary air and fuel supply at a throttling point in the intake passage beyond the region of heat supply in the direction toward the engine cylinders. Thus the main air supply is not heated prior to admixture with the highly vaporized fuel and primary air mixture, and the available heat, preferably heat of exhaust gases, is not wasted in useless heating of the main air supply of the charge, but effectively used for thorough fuel vaporization. I thus avoid the rarefaction of the entire mixture which reduces volumetric efficiency, which would be attendant upon making heat application to the entire mixture including the main air. With this arrangement for selective heating of fuel and primary air and thereafter admitting the main air cold, I combine anterior throttling, or in other words, the supplying of the fuel within the region of intake depression, and so secure, along with cold, dense charges containing highly vaporized fuel, the numerous features of advantage of the anterior throttle carburetor.

The metering principles and provisions disclosed in my application for anterior throttle carburetor, Ser. No. 737,186, are well adapted to permit the separation of the primary air and fuel supply from the main air supply, heating the former and bringing the latter into admixture therewith in previously cold or unheated state, and such embodiment of the invention is selected for illustration herein.

In the drawing,

Fig. 1 is a diagrammatical sectional view of an automobile engine carburetor embodying and illustrating my invention;

Fig. 2 is a diagrammatical side elevational view showing the development of the camming peripheral surface of the cam for actuating the fuel metering pin;

Fig. 3 is a graph of area change of the metering orifice, and,

Fig. 4 is a diagrammatical view of the valve operating linkage.

The carburetor is preferably of the down draft type comprising an elongated structure with the primary air and fuel supply in the highest part, the heating means therebeneath, and the main air throttle below the heating means. Fuel is supplied through the main fuel jet. The extent of opening of the main fuel supply orifice 10, fed from the constant level float chamber 11, is regulated by the fuel modulating pin 12. Pin 12 is retracted by spring 14 and actuated in opposite direction by cam 16, turning with the throttle or main air valve 18, and engaging slide-bar 19 which carries the pin valve 12. At idling the cam 16 is engaged at the cam part C1, providing an opening of the fuel orifice 10, as indicated at M1, Fig. 3, predetermined to supply the fuel required for engine idling operation, and eliminating need for a separate idling fuel by-pass. The slab terminal formation of the modulating pin 12, indicated at 20, whereby the fuel flow is concentrated in a passage of sector-shaped cross-sectional formation, relieves the flow of the fuel through the metering orifice from undue frictional retardation such as would be imposed by its flow through an annular shaped passage, for example. With such arrangement, together with reduced pressure differential effective during idling and other periods of high intake depression at the fuel orifice 10, as described below, and whereby undue orifice restriction is avoided, a constant uniform flow of idling fuel is obtained, free from objectionable fluctuation.

In the form shown, the throttle valve 18 is of sleeve formation and is rotated through a relatively small angle to bring its slots 18a into and out of register with slots 18b leading to the engine intake, whereby to regulate the extent of main air inlet opening at 18 in consonance with the extent of fuel passage opening at 10. Crank 18c on the cam shaft 16a is connected by link 18d to arm 18e of the throttle actuating crank 18e, a pair of arms 18f, 18f on crank 18e engage between them a lug 18g on the sleeve throttle 18 to actuate same. The manual connection for throttle control and throttle retracting spring (not shown) may be attached wherever most convenient as, for example, to crank arm 18f.

The fuel-to-air ratio for idling can be regulated by varying the air component. One way of doing this is to alter the dimension of the small air holes 22 in the throttle sleeve 18 or elsewhere. Another way is by adjustability of throttle closing position.

The fuel is delivered from metering orifice 10 into the primary air passage 24, and is pulverized by introduction into the high-velocity air stream moving through said passage. Air inlet valve 26 to passage 24 is wide open at idling, the main air valve or throttle 18 being substantially closed, and the static depression in the main air passage or intake conduit as at 28 being communicated through duct 30 to the induction chamber 32, thereby compressing spring 133 and retracting and opening the primary air valve 26, which is preferably of tapered pin or needle formation. With the primary air inlet valve 26 wide open, the pressure differential upon the neighboring fuel orifice 10 is substantially reduced, and this lowered pressure differential is a material factor in permitting use of the main fuel passage for idling, which is of sufficient size and has sufficiently low frictional retardation to fuel flow, to secure constant fuel flow while idling, with freedom from objectionable fluctuation. The fuel is vaporized by application of heat made to the mixture of fuel and primary air prior to the admission of air through the main air valve or throttle 18. To this end the primary air passage 24 delivers the fuel and primary air mixtures through nozzle 24a to a heating chamber 33 having its inner wall arranged for efficient supply of heat from the exhaust gases of the engine or part thereof. As shown such inner wall is formed by a nipple 33a of copper, interposed between and joining the exhaust conduit parts 33b, 33c to constitute in effect a section of the exhaust conduit, and ribs or fins 33d may be provided in nipple or section 33a to concentrate the heat transfer on the wall part encountered by the fuel and air mixture issuing from the preferably flaring nozzle 24a forming a continuation of the fuel and primary air passage 24. As shown nozzle 24a discharges down upon the upper wall of heater section 33a, maintained by the exhaust gases at a temperature adapted for spheroidal vaporization of the fuel, and the fuel droplets or spheres impinging thereon are flashed into vapor, the heat supplied being very largely transformed into latent heat of vaporization. The fuel particles are projected or impelled against the heater section where they are subjected to temperatures higher than the end point of the fuel to produce spheroidal vaporization. For example, the end points for gasoline of various gravities range from about 300° F. to 524° F., and the spheroidal points in the same order range from 350° F. to 620° F. The exhaust gas temperatures vary under various conditions of engine operation from about 300° F. to 400° F. to about 1400° F. to 1500° F., the low temperatures occurring at engine idling and the highest temperatures occurring at full load high speed. The exhaust gas temperatures vary directly with ignition retardation, the extent of variation depending on the load and speed of the engine. The exhaust gas temperatures also vary directly with the engine speed and with the percent of engine load. The exhaust gas temperature also varies directly with the fuel flow rate, and are less with mixture ratios slightly richer than the high power ratio. It will thus be seen that the exhaust gas temperatures actually available are adequate, except at low speeds-light load, to substantially produce spheroidal vaporization of fuel throughout the range of engine operation, provided this heat is adequately transferred to the fuel. At engine idling and very light loads, the high depression and very little fuel used produces excellent atomization and entrainment, all as pointed out in my prior application Serial No. 646,687, filed December 10, 1932. Heating chamber 33 about the exhaust conduit section 33a is preferably of annular formation, and by the dividing and meeting downward flow of the gases and vapors the primary air and fuel components are further admixed and homogenized. The resulting well prepared mixture of fuel and primary air is centrally discharged through the main fuel nozzle 34 into the region of high depression at the Venturi throat 35, and there admixed with cold air admitted by the throttle 18 into said Venturi throat around nozzle 34, supplying a homogeneous dense mixture well adapted for uniform distribution to the engine cylinders.

Fractional load operation is performed under part throttle openings with turning movement of cam 16 in engagement with slidebar 19 through substantially the portion marked C2 in Fig. 2. At the higher engine speeds within this range the fuel-to-air ratio can approach its leanest and most economical values. The intake depression is comparatively high throughout this range and at any given throttle opening the intake depression increases with the engine speed. In this part of the range of engine operation, uniform fuel flow is favored by having both a modulation of fuel passage 10 and a primary air influence of pressure control upon the fuel orifice that will cause the fuel to flow correctly and uniformly for any given speed at each position of the metering pin.

During fractional load operation the primary air valve 26 under control of intake depression acting through the duct 30 serves at times to vary the extent of opening of the air inlet passage, the opening for admission of primary air being decreased as the engine speed decreases below certain revolutions per minute. At other times the volume of primary air varies with engine speed even though the valve 26 remains wide open, the effect thereby being to coordinate with fuel orifice modulation the differential pressures required conducive of proper fuel flow values for the most efficient and economical engine operation.

In making the transition from fractional load operation to full load operation a point is reached as the throttle is opened at which the resulting decrease in intake depression partially closes valve 26, and materially reduces the primary air inlet opening. While the general intake depression at this time is lowered, the considerable cutting down of the extent of opening of the primary air inlet passage 24 has the effect of making a greater proportion of the general intake depression effective within the primary air passage 24, and thereby relatively increasing the pressure differential effective at the fuel metering orifice 10. Without reduction of the extent of opening of fuel orifice 10 at such periods increased fuel flow and over-enrichment of the mixture would result. To avoid this and secure properly calibrated flow at such intervals, the formation of the fuel metering cam is reversed in this neighborhood, say at about three-quarter throttle opening, as indicated at C3, Fig. 2, so that at such throttle opening the fuel modulating pin 12 is moved somewhat toward closed position, thus cutting down the fuel flow and avoiding over-enrichment, as indicated at M3, Fig. 3. By this reversal of cam formation, proper enrichment in the transition period is accomplished in a simple, easy manner, and there is no occasion in this transition period for resorting to interference with movement of the primary air valve 26 in response to changes in intake depression, as would be caused if, for example, the over-enrichment were avoided by provision of means for mechanically controlling the closing movement of valve 26.

During full load operation the fuel supply is varied directly with the air flow by locating the main jet 34 in the throat of the large Venturi passage 35 of the carburetor where it is subject to maximum depression available. During fullload operation intake depression is relatively low, even for high speeds, and the spring 133 acting against the induction primary air needle 26 holds this induction operated valve 26 to its seat throughout full load operation. During certain ranges of full load operation substantially all available depression must be effective upon fuel orifice 10 in order to produce fuel flow productive of the needed mixture strength. The small air inlet orifice 36 provided in the wall of air conduit 24 adjacent to the seat of valve 26 permits a limited amount of air to pass through the conduit 24 during that part of full load operation in which the engine speed and the intake depression is sufficient to prevent the fuel level from filling the well portion 24w of passage 24, which will be referred to later. The small orifice 36 is preferably formed in a replaceable bushing and is so calibrated as not to lower the depression within the conduit 24 materially and at the same time to permit air inlet sufficient when valve 26 is closed to air vent the passage 24 and keep the fuel moving at a rate to prevent the well 24w from filling during full load operation, except at low speed. By change in area of the small orifice 36, the fuel flow and the fuel-to-air ratio can be increased or decreased as needed.

A fuel jet 38 in tandem ahead of orifice 10 and of smaller bore than said orifice 10 is used entirely for fuel metering without metering pin modulation during wide open stages of operation, the modulating pin 12 being raised by spring 133 to bear against the metering cam portion C4 to produce an orifice at 10 of an area in excess of the area of the jet 38. The uniform cylindrical bore 38 of predetermined size which meters the fuel during full load operation as indicated at M4, Fig. 3, is a more accurate metering instrumentality than the modulated orifice used during the other stages of operation. Using such full load fuel jet 38 of smaller diameter than metering orifice 10 for full load fuel metering simplifies the functions and design of the metering pin 12, facilitates calibration changes, and affords a simple means of changing the full load mixture ratios to get uniformly good full load operation, such changes being readily accomplished by replacement of one removable jet 38 by another of slightly different orifice size. During low speed engine operation at full load, the mixture ratio should be strengthened because of the high torque or "lugging" requirements of the engine, and the need to avoid early "stalling". The depression during this part of operation is extremely low. Mixture enrichment is accomplished by the hydrostatic action of the fuel rising in well 24w and in both the downwardly extending branch 24d thereof and the upwardly extending branch 24u thereof by gravity when the intake depression becomes thus extremely low, thereby closing off or plugging the conduit 24 with liquid fuel, rendering inactive the air orifice 36, and thus enriching the mixture by reducing the height through which the fuel is lifted, and by producing flow of solid liquid fuel alone through passage 24 in response to the pressure differential. The depth of submergence of the fuel orifice below the level in float chamber 11 which can be varied or adjusted, as by changing the float level, which together with the elevation of outflow floor line 24f of passage 24, above the fuel level, determine the extent of enrichment of mixture ratio during this period of operation when the fuel rises in the passage 24 and air is no longer admitted at 36. The fuel level in reservoir 11 as controlled by the float is not critical except at lowspeed full-load, when the carburetor functions at such extremely low depression. With parts disposed about as shown in Fig. 1 and the floor level part 24f of passage 24 at about the height shown above the fuel level line 11a, the carburetor will function to supply metered fuel at an intake depression of about one inch of water.

When depression goes to practically zero, as upon sudden opening of the throttle, (accompanied by pumping in of acceleration or stall preventing fuel, described below), conduit 24 and its well 24w are momentarily filled with liquid fuel. Siphoning adjustment of fuel level, as adjustment thereof up to near the passage floor 24f, can be resorted to, if desired, to furnish fuel for minimum engine speed at full load, but siphoning fuel losses will not take place when the engine is at rest, with throttle (and metering pin 12) closed by the usual throttle spring since the orifice at 10 is too small to permit fuel to flow at atmospheric pressures.

Pump piston 50 actuated with the main throttle, as by crank 52 and link 53, and working in fuel well 54 communicating with fuel chamber 11 through passage 55, supplied with check valve 56, can supply fuel for starting and deliver accelerating fuel charges upon opening throttle movement. Acceleration fuel nozzle 58 directs the acceleration fuel discharge downward and for impingement against the heater 33a in chamber 33 alongside the primary air and fuel nozzle 24a. A tube 62 having an orifice at its top about No. 80 size supplies the fuel to nozzle 58. When the engine is operating normally, slots 64 leading from nozzle tube 58 to atmosphere function to contribute to idling air through nozzle 58, and short-circuit and reduce the depression effective upon the fuel supply tube 62 so that fuel will not flow from the pump well 54 by influence of depression. The relationship of the discharge orifice from tube 62 to the slots 64 is predetermined to elevate the level of liquid within the passage 66 leading to tube 62 sufficiently so that upon pumping movements of acceleration the fuel delivery through the nozzle 58 will be instantaneous, even from slight opening changes in throttle position. With this arrangement, fuel is instantaneously supplied to the engine to materially supplement the main fuel supply at periods when intake depression falls to zero, and the quantity of accelerating fuel supplied corresponds to the stroke given to the piston 50 upon advancing the throttle for accelerating the engine.

The intake manifold 70 preferably comprises upwardly extending branches 72, 74 from a lowermost median region 76, into which the mixture from the carburetor is received and distributed to the branches. Thus a well region is provided at 76, and this well is vented by means of the floor vent 78 preferably formed in a plug 80. The vent passage is preferably formed with an upwardly extending part 82 and a downwardly extending part 84 terminating at 86 below the surface of such small accumulations of liquid fuel as may collect in the well, as in case of excess fuel being pumped in at acceleration periods, or fuel accumulating at shutting off of the engine and the like. In this way objectionable fuel dripping is avoided and effective use made of accumulated fuel, as upon engine starting.

It will be seen from the foregoing that provision is made for metering the fuel and primary air components for all conditions of engine operation, that heat is applied to such mixture containing all the fuel and only a small part of the air in manner adapted for highly efficient fuel vaporization whereby the heat is largely stored as latent heat of vaporization, and that this mixture and the main air supply in previously cold or unheated state are led together to finally provide a dense mixture at low temperatures adapted to give maximum volumetric efficiency, and that therewith the advantages of the anterior throttle carburetor and accurately metered fuel and air are combined.

I claim:

1. In an anterior throttle carburetor for an internal combustion engine, a chambered casing, a conduit for exhaust gas passage comprising a highly heat conductive wall portion extending through the chamber in the casing, means for discharging fuel into admixture with primary air only into said chamber and in engagement with said heated wall, means for pumping accelerating fuel into engagement with said heated wall, valveless means for conducting air and vaporized fuel from said chamber to the engine cylinders, and throttle means for supplying main air cold in a stream surrounding the said conducting means.

2. In a carburetor for an internal combustion engine, means for admixing fuel and primary air, an exhaust gas conduit section of highly heat-conductive metal, an annular chamber surrounding such section of the exhaust conduit, means for delivering the mixture of fuel and primary air against a side of said section of the exhaust gas conduit and through said annular passage therearound, whereby the fuel is spheroidally vaporized, a tubular member through which the mixture of primary air and vaporized fuel is passed, a sleeve throttle for controlling admission of main air in an annular region about said tubular member, whereby the main air is admixed with the mixture of primary air and fuel, and an intake conduit leading to the engine cylinders, the delivery end of said tubular member being intermediate said throttle and the engine cylinders.

3. In an anterior throttle carburetor for an internal combustion engine, means for admixing fuel and primary air, means adapted to be heated by exhaust gas and positioned in the path of movement of the fuel and primary air for heating such mixture to thoroughly vaporize the fuel, main air supplying means for introducing the main portion of the air cold into admixture with the primary air and vaporized fuel, valveless conduit means subjected at all times to the full suction in the engine cylinders for delivering the resulting dense cool mixture to the engine cylinders, and means for controlling the idling mixture.

4. In a carburetor for an internal combustion engine, means for supplying fuel to the region of intake depression on the engine cylinder side of the throttle, means for supplying primary air into admixture therewith, heat applying means in the path of the mixture of fuel and primary air, a throttle for admitting main cold air into admixture with said primary air and fuel after the same has been vaporized by the heat applying device, a valveless conduit for delivering the completed mixture to the engine cylinders, and means for controlling the flow of fuel for engine idling.

5. In a carburetor for an internal combustion engine, means for admixing fuel and primary air, a chambered casing, a conduit in the path of delivery of said mixture of fuel and primary air extending through the chamber, a tubular member through which the heated mixture of primary air and fuel is passed, a throttle valve for controlling the admission of main air about said tubular member whereby the main air is mixed with the mixture of primary air and fuel, an intake conduit leading to the engine cylinders, the delivery end of the tubular member being intermediate the throttle valve and the engine cylinders, and means for controlling the idling mixture delivered to the engine.

ARLINGTON MOORE.